United States Patent
Kohli et al.

(10) Patent No.: US 8,953,888 B2
(45) Date of Patent: Feb. 10, 2015

(54) DETECTING AND LOCALIZING MULTIPLE OBJECTS IN IMAGES USING PROBABILISTIC INFERENCE

(75) Inventors: Pushmeet Kohli, Cambridge (GB); Victor Lempitsky, Oxford (GB); Olga Barinova, Moscow (RU)

(73) Assignee: Microsoft Corporation, Redmond, WA (US)

( * ) Notice: Subject to any disclaimer, the term of this patent is extended or adjusted under 35 U.S.C. 154(b) by 595 days.

(21) Appl. No.: 13/024,933

(22) Filed: Feb. 10, 2011

(65) Prior Publication Data

US 2012/0207346 A1    Aug. 16, 2012

(51) Int. Cl.
*G06K 9/46* (2006.01)
*G06K 9/00* (2006.01)
*G06K 9/62* (2006.01)

(52) U.S. Cl.
CPC .......... *G06K 9/00369* (2013.01); *G06K 9/6211* (2013.01)
USPC ....................................................... 382/190

(58) Field of Classification Search
CPC ..................... G06F 17/2818; G06K 9/00375
USPC .................. 382/160, 228, 201, 226, 103, 190
See application file for complete search history.

(56) References Cited

U.S. PATENT DOCUMENTS

| | | | |
|---|---|---|---|
| 6,542,621 | B1 | 4/2003 | Brill et al. |
| 7,822,252 | B2 | 10/2010 | Bi et al. |
| 2007/0179921 | A1 | 8/2007 | Zitnick et al. |
| 2010/0008540 | A1 | 1/2010 | Shet et al. |

OTHER PUBLICATIONS

Kumar et al., A Discriminative Voting Scheme for Object Detection using Hough Forests [on-line], Sep. 2010 [retrieved on Mar. 20, 2013], BMVC Press, pp. 1-10. Retrieved from the Internet: http://www.bmva.org/bmvc/2010/workshop/paper3/index.html.*
Kushal et al., Flexible Object Models for Category-LEvel 3D Object Recognition [on-line], Jun. 17-22, 2007 [retrieved on Mar. 20, 2013], IEEE Conference on Computer Vision and Pattern Recognition, 2007, 8 pages. Retrieved from the Internet: http://ieeexplore.ieee.org/xpls/abs_all.jsp?arnumber=4270174&tag=1.*
Leibe et al., An Implicit Shape Model for Combined Object Categorization and Segmentation [on-line], 2006 [retrieved on Mar. 20, 2013], Lecture Notes in Computer Science, vol. 4170, pp. 508-524. Retrieved from the Internet: http://link.springer.com/chapter/10.1007%2F11957959_26?LI=true#.*

(Continued)

*Primary Examiner* — Matthew Bella
*Assistant Examiner* — Dennis Rosario
(74) *Attorney, Agent, or Firm* — Miia Sula; David Andrews; Micky Minhas

(57) ABSTRACT

An object detection system is disclosed herein. The object detection system allows detection of one or more objects of interest using a probabilistic model. The probabilistic model may include voting elements usable to determine which hypotheses for locations of objects are probabilistically valid. The object detection system may apply an optimization algorithm such as a simple greedy algorithm to find hypotheses that optimize or maximize a posterior probability or log-posterior of the probabilistic model or a hypothesis receiving a maximal probabilistic vote from the voting elements in a respective iteration of the algorithm. Locations of detected objects may then be ascertained based on the found hypotheses.

20 Claims, 6 Drawing Sheets

(56) References Cited

OTHER PUBLICATIONS

Fritz et al., Integrating Representaive and Discriminant Models for Object Category Detection [on-line], Oct. 17-21, 2005 [retrieved on Mar. 20, 2013], Tenth IEEE International Conference on Computer Vision, 2005, vol. 2, pp. 1363-1370. Retrieved from the Internet: http://ieeexplore.ieee.org/xpls/abs_all.jsp?arnumber=1544878.*
Biau et al., Consistency of Random Forests and Other Averaging Classifiers [on-line], Jun. 1, 2008 [retrieved on Jul. 23, 2013], Journal of Machine Learning Research, vol. 9, pp. 2015-2033. Retrieved from the Internet: http://dl.acm.org/citation.cfm?id=1442799.*
Bosch et al., Image Classification using Random Forests and Ferns [on-line], Oct. 14-21, 2007 [retrieved on Oct. 15, 2013], IEEE 11th International Conference on Computer Vision, 2007, 8 total pages. Retrieved from the Internet: http://ieeexplore.ieee.org/xpls/abs_all.jsp?arnumber=4409066&tag=1.*
Agarwal, et al., "Learning to detect objects in images via a sparse, part-based representation," IEEE Transactions on Pattern Analysis and Machine Intelligence, vol. 26, No. 11, Nov. 2004, retrieved at <<http://ieeexplore.ieee.org/stamp/stamp.jsp?tp=&arnumber=1335452>>, pp. 1475-1490.
Amit, et al., "Shape quantization and recognition with randomized trees," Aug. 1996, retrieved at <<http://citeseerx.ist.psu.edu/viewdoc/download;jsessionid=A8959CE90DC8295E266AF1268D6F4AD0?doi=10.1.1.102.5478&rep=rep1&type=pdf>>, pp. 1-56.
Andriluka, et al., "People-tracking-by-detection and people-detection-by-tracking," IEEE Conference on Computer Vision and Pattern Recongnition, CVPR 2008, Jun. 23-28, 2008, Anchorage AK, retrieved at <<http://www.cs.ucf.edu/courses/cap6412/fall2008/papers/cvpr08andriluka.pdf>>, pp. 1-8.
Ballard, et al., "Generalizing the hough transform to detect arbitrary shapes," Pattern Recognition, vol. 13, No. 2, pp. 11-122, 1981, Great Britain, retrieved at <<http://www.eecs.umich.edu/~silvio/teaching/EECS598/papers/Ballard.pdf>>, pp. 111-122.
Borenstein, et al., "Class-Specific, Top-Down Segmentation," (c) Springer-Verlag Berlin Heidelberg 2002, retrieved at <<http://citeseerx.ist.psu.edu/viewdoc/download?doi=10.1.1.88.953&rep=rep1&type=pdf>>, 14 pages.
Bosch, et al., "Image Classification using Random Forests and Ferns," (c) 2007, IEEE, retrieved at <<http://ieeexplore.ieee.org/stamp/stamp.jsp?tp=&arnumber=4409066>>, 8 pages.
Bourdev, et al., "Poselets: Body Part Detectors Trained Using 3D Human Pose Annotations," IEEE 12th International Conference on Computer Vision, Sep. 29-Oct. 2, 2009, Kyoto, retrieved at <<http://www.eecs.berkeley.edu/Research/Projects/CS/vision/human/poselets_iccv09.pdf>>, 8 pages.
Breiman, "Random Forests," Machine Learning, vol. 45, No. 1, Springer Link, retrieved at <<http://oz.berkeley.edu/users/breiman/randomforest2001.pdf>>, Jan. 2001, 32 pages.
Dalal, et al., "Histograms of Oriented Gradients for Human Detection," Proceedings of the 2005 IEEE Computer Society Conference on Computer Vision and Pattern Recognition (CVPR'05), (c) 2005, retrieved at <<http://ieeexplore.ieee.org/stamp/stamp.jsp?tp=&arnumber=1467360>>, 8 pages.
Denis, "Efficient edge-based methods for estimating manhattan frames in urban imagery," (c) 2008, retrieved at <<http://mirror.cvr.yorku.ca/YorkUrbanDB/pdenisThesis.pdf>>, 88 pages.
Desai, et al., "Discriminative models for multi-class object layout," IEEE 12th International Conference on Computer Vision, Sep. 29-Oct. 2, 2009, Kyoto, retrieved at <<http://www.ics.uci.edu/~dramanan/papers/nms.pdf>>, 8 pages.
Frey, et al., "Clustering by Passing messages between data points," downloaded from www.sciencemag.org on Feb. 15, 2007, retrieved at <<http://citeseerx.ist.psu.edu/viewdoc/download;jsessionid=086DF3FC0A93E86C4ABF709ADE60E5A4?doi=10.1.1.121.3145&rep=rep1&type=pdf>>, 23 pages.
Gall, et al., "Class-Specific Hough Forests for Object Detection," IEEE Conference on Computer Vision and Pattern Recognition, Jun. 20-25, 2009, Miami, FL, USA, retrieved at <<http://citeseerx.ist.psu.edu/viewdoc/download?doi=10.1.1.161.9407&rep=rep1&type=pdf>>, 8 pages.
Gu, et al., "Recognition using Regions," IEEE Conference on Computer Vision and Pattern Recognition, Jun. 20-25, 2009, Miami, FL, USA, retrieved at <<http://people.csail.mit.edu/lim/paper/glam_cvpr09.pdf>>, 8 pages.
Hoiem, et al., "3D LayoutCRF for Multi-View Object Class Recognition and Segmentation," IEEE Conference on Computer Vision and Pattern Recognition (CVPR 2007), Jun. 17-22, 2007, Minneapolis, MN, retrieved at <<http://citeseerx.ist.psu.edu/viewdoc/download?doi=10.1.1.70.8212&rep=rep1&type=pdf>>, 8 pages.
Kim, "Hierarchical classification of images with sparse approximation", retrieved on Feb. 8, 2011 at <<www.eecs.umich.edu/techreports/systems/cspl/csp1-395.pdf>>, 14 pages.
Lampert, et al., "Beyond sliding windows: object localization by efficient subwindow search," Conference on Computer Vision and Pattern Recognition, Jun. 23-28, 2008, retrieved at <<http://citeseerx.ist.psu.edu/viewdoc/download?doi=10.1.1.149.4517&rep=rep1&type=pdf>> pp. 1-8.
Lazic, et al., "FLoSS: Facility Location for Subspace Segmentation," IEEE 12th International Conference on Computer Vision, Sep. 29-Oct. 2, 2009, retrieved at <<http://www.psi.toronto.edu/publications/2009/iccv09_final.pdf>>, 8 pages.
Leibe, et al., "Interleaved object categorization and segmentation," in British Machine Vision Conference (BMVC'03), Norwich, UK, Sep. 2003, retrieved at <<http://citeseerx.ist.psu.edu/viewdoc/download;jsessionid=D7B0339D93476A65141DC4051DD3271D?doi=10.1.1.3.4356&rep=rep1&type=pdf>>, 10 pages.
Leibe, et al., "Robust Object Detection with Interleaved Categorization and Segmentation," International Journal of Computer Vision, vol. 77, Nos. 1-3, Received: Sep. 2, 2005 / Accepted: Sep. 18, 2007 / Published online: Nov. 17, 2007, retrieved at <<http://www.cognitivesystems.org/publications/fulltext.pdf>>, pp. 259-289.
Leibe, et al., "Robust Object Detection with Interleaved Categorization and Segmentation," Submission to the IJCV Special Issue on Learning for Vision and Vision for Learning, Sep. 2005, 2nd revised version Aug. 2007. retrieved at <<http://www.vision.ee.ethz.ch/~bleibe/papers/leibe-interleaved-ijcv07final.pdf>>, 26 pages.
Lepetit, et al., "Randomized Trees for Real-Time Keypoint Recognition," IEEE Computer Society Conference on Computer Vision and Pattern Recognition, 2005, retrieved at <<http://ieeexplore.ieee.org/stamp/stamp.jsp?tp=&arnumber=1467521>>, 7 pages.
Maji, et al., "Object Detection using a Max-Margin Hough Transform," IEEE Conference on Computer Vision and Pattern Recognition (CVPR 2009), Jun. 20-25, 2009, retrieved at <<http://www.cs.berkeley.edu/~smaji/papers/smaji-cvpr09.pdf>>, 8 pages.
Maree, et al., "Random subwindows for robust image classification," International Conference on Computer Vision and Pattern Recognition (CVPR), San Diego, CA, USA, Jun. 20-25, 2005, retrieved at <<http://citeseerx.ist.psu.edu/viewdoc/download?doi=10.1.1.69.8683&rep=rep1&type=pdf>>, 7 pages.
Moosmann, et al., "Fast discriminative visual codebooks using randomized clustering forests," Advances in neural information processing systems, 2007, No. 19, pp. 985-992, retrieved at <<http://citeseerx.ist.psu.edu/viewdoc/download?doi=10.1.1.72.7708&rep=rep1&type=pdf>>, 7 pages.
Mutch, et al., "Multiclass object recognition with sparse, localized features," IEEE Computer Society Conference on Computer Vision and Pattern Recognition, Jun. 17-22, 2006, retrieved at <<http://citeseerx.ist.psu.edu/viewdoc/download?doi=10.1.1.67.5445&rep=rep1&type=pdf>>, pp. 11-18.
Nowak, et al., "Sampling strategies for bag-of-features image classification," (c) Springer-Verlag Berlin Heidelberg 2006, ECCV 2006, retrieved at <<http://lear.inrialpes.fr/people/nowak/dwl/eccv06.pdf>>, 14 pages.
Okada, "Discriminative generalized hough transform for object detection," IEEE 12th International Conference on Computer Vision (ICCV 2009), retrieved at <<http://ieeexplore.ieee.org/stamp/stamp.jsp?tp=&arnumber=5459441>>, 6 pages.
Opelt, et al., "Learning an alphabet of shape and appearance for multi-class object detection," International Journal of Computer

(56) References Cited

OTHER PUBLICATIONS

Vision, Springer, 2008, retrieved at <<http://eprints.pascal-network.org/archive/00006556/01/opelt08.pdf>>, 29 pages.

Pang, et al., "Multiple instance boost using graph embedding based decision stump for pedestrian detection," In European Conference on Computer Vision, 2008 (ECCV 2008), retrieved at <<http://www.jdl.ac.cn/doc/2008/eccv2008submission.pdf>>, 12 pages.

Pang, et al., "Pedestrian detection via logistic multiple instance boosting," (c) 2008, IEEE, retrieved at <<http://ieeexplore.ieee.org/stamp/stamp.jsp?arnumber=04712042>>, pp. 1464-1467.

Quinlan, "Induction of Decision Trees," Machine Learning 1:81-106, (c) 1986 Kluwer academic Publishers, Boston—Manufactured in the Netherlands, retrieved at <<http://classes.engr.oregonstate.edu/eecs/fall2009/cs434/decisiontree-quinlan.pdf>>, 26 pages.

Schroff, et al., "Object class segmentation using random forests," In Proceedings of the British Machine Vision Conference, 2008, retrieved from <<http://citeseerx.ist.psu.edu/viewdoc/download?doi=10.1.1.165.3531&rep=rep1&type=pdf>>, 10 pages.

Seemann, et al., "Cross-articulation learning for robust detection of pedestrians," Pattern Recognition, Lecture Notes in Computer Science, 2006, vol. 4174/2006, retrieved at <<http://citeseerx.ist.psu.edu/viewdoc/download?doi=10.1.1.90.948&rep=rep1&type=pdf>>, 10 pages.

Sharp, "Implementing decision trees and forests on a GPU," (c) Springer-Verlag Berlin Heidelberg 2008, ECCV 2008, retrieved at <<http://research.microsoft.com/pubs/71445/ForestFire.pdf>>, pp. 595-608.

Sheikh, et al., "Mode-Seeking Medoidshifts," IEEE (c) 2007, retrieved at <<http://ieeexplore.ieee.org/stamp/stamp.jsp?tp=&arnumber=4408978>> 8 pages.

Shotton, et al., "Efficiently combining contour and texture cues for object recognition," In BMVC, 2008, retrieved at <<http://citeseerx.ist.psu.edu/viewdoc/download;jsessionid=6A88D765A3DB7A5AB4FC22F1207ED1CE?doi=10.1.1.150.940&rep=rep1&type=pdf>>, 10 pages.

Shotton, et al., "Multiscale categorical object recognition using contour fragments," IEEE Transactions on Pattern Analysis and Machine Intelligence, vol. 30, No. 7, Jul. 2008, retrieved at <<http://ieeexplore.ieee.org/stamp/stamp.jsp?tp=&arnumber=4359372>>, pp. 1270-1281.

Shotton, et al., "Semantic Texton Forests for Image Categorization and Segmentation," IEEE Conference on Computer Vision and Patern Recognition (CVPR 2008), Jun. 23-28, 2008, Anchorage, AK, retrieved at <<http://citeseerx.ist.psu.edu/viewdoc/download?doi=10.1.1.145.3036&rep=rep1&type=pdf>>, 8 pages.

Torralba, et al., "Statistical context priming for object detection," Eight IEEE International Conference on Computer Vision (ICCV 2001), Jul. 7-14, 2001, retrieved at <<http://citeseerx.ist.psu.edu/viewdoc/download?doi=10.1.1.17.8553&rep=rep1&type=pdf>>, 8 pages.

Torrione, et al., "Multiple instance and context dependent learning in hyperspectral data," (c) 2009, IEEE, retrieved at <<http://ieeexplore.ieee.org/stamp/stamp.jsp?arnumber=05289021>>, 14 pages.

Vinyals, et al., "An evaluation of an object recognition schema using multiple region detectors," Proceeding of the 2007 conference on Artificial Intelligence Research and Development, (c) 2007, retrieved at <<http://www.iiia.csic.es/~aramisa/pub/ccia07object.pdf>>, 10 pages.

Viola, et al., "Robust Real-time Object Detection," Second International Workshop on Statistical and Computational Theories of Vision—Modeling, Learning, Computing, and Sampling, Vancouver, Canada, Jul. 13, 2001, retrieved at <<http://research.microsoft.com/en-us/um/people/viola/Pubs/Detect/violaJones_IJCV.pdf>> , 25 pages.

Winn, et al., "The Layout Consistent Random Field for Recognizing and Segmenting Partially Occluded Objects," IEEE Computer Society Conference on Computer Vision and Pattern Recognition, Jun. 17-22, 2006, retrieved at <<http://citeseerx.ist.psu.edu/viewdoc/download?doi=10.1.1.61.7150&rep=rep1&type=pdf>>, 8 pages.

\* cited by examiner

DETECTING AND LOCALIZING MULTIPLE OBJECTS IN IMAGES USING PROBABILISTIC INFERENCE

BACKGROUND

Object detection has received growing interest and attention from academia and industries in recent years. This growing interest and attention stems from an ever-increasing need to efficiently and accurately detect and identify an object of interest (e.g., a person, a vehicle, etc.) in such application fields as security, data mining, or the like.

Given an image, for example, object detection methods may be used to determine a presence and a location (if present) of an object within the image. Because of the complex nature of visual information and presences of an unknown number of objects of different types in the image, however, existing object detection methods normally simplify this detection of an object of interest by making various heuristic assumptions about the object of interest and/or background in the image. Due to this reliance on the heuristic assumptions, false positives (i.e., indicating a detection of an object of interest when the object is not present) and false negatives (i.e., failing to detect an object of interest when the object is present) are usually unavoidable in the existing object detection methods. Furthermore, these heuristic assumptions may be valid in one type of situation (such as certain background) but fail to adapt to another type of situation.

SUMMARY

This summary introduces simplified concepts of object detection, which is further described below in the Detailed Description. This summary is not intended to identify essential features of the claimed subject matter, nor is it intended for use in limiting the scope of the claimed subject matter.

This application describes example embodiments of object detection. In one embodiment, an image including an unknown number of objects to be detected may be received. In response to receiving the image, a plurality of voting elements may be obtained from the image. In some embodiments, the plurality of voting elements may be capable of placing votes on one or more hypotheses to determine one or more locations of one or more objects in the image. A probabilistic model may be derived based at least on the plurality of voting elements. In one embodiment, locations of a plurality of objects may be ascertained in the image based at least in part on the probabilistic model and a greedy algorithm that maximizes a joint probability of a plurality of hypotheses for the locations of the plurality of objects.

In some embodiments, a greedy algorithm may be applied to iteratively assign a voting element of the one or more voting elements to a hypothesis of the one or more hypotheses in response to determining that assigning the voting element to the hypothesis increases a log-posterior probability associated with the probabilistic model. In some embodiments, a location of an object may be ascertained in the image in response to determining that votes for a hypothesis for the location of an object are maximum among the one or more hypotheses in a respective iteration of the greedy algorithm.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
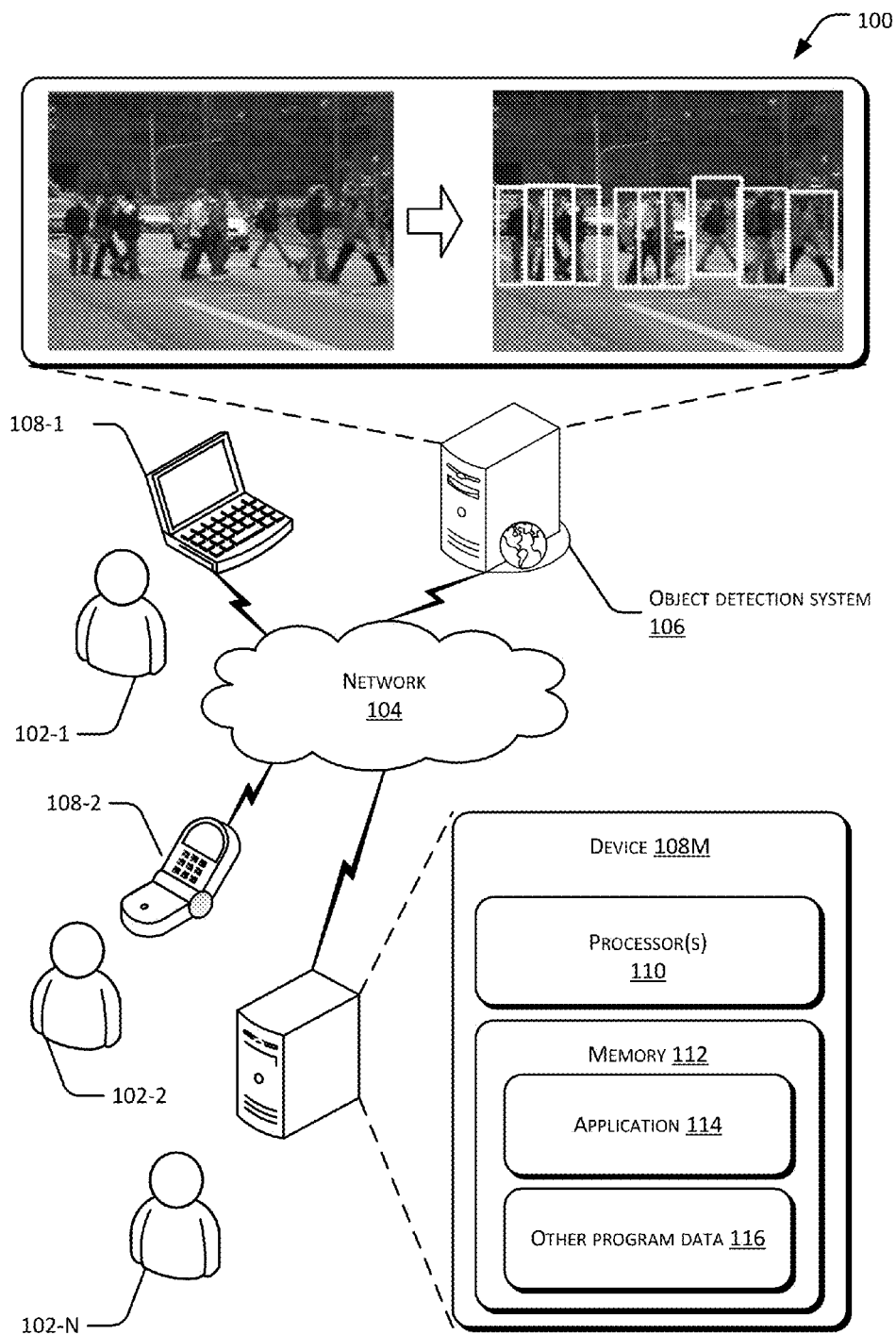
FIG. 1 illustrates an exemplary environment including an example object detection system.

As noted above, the current object detection methods normally require making heuristic assumptions to simplify an object detection process. For example, non-maxima suppression heuristics are often used to suppress less salient features in favor of more salient features in object detection methods. These non-maxima suppression heuristics arbitrarily use a number of parameters to control a boundary between a less salient feature and a more salient feature. Therefore, these heuristic assumptions may sometimes work for certain types of situations, but fail to adapt to other situations. Furthermore, human intervention may be required to adjust some of the parameters used in the heuristic assumptions even for those feasible situations.

This disclosure describes an object detection system, which detects objects of interest in a probabilistic framework. Rather than making heuristic assumptions about the object of interest and/or background scene in an image, the described object detection system detects locations of the objects by determining that hypotheses for the locations of the objects cooperatively return a maximum probability associated with the probabilistic framework.

Generally, an object detection system receives an image which may include a plurality of objects of interest. In one embodiment, the number of objects of interest included in the image may be unknown to the object detection system. In another embodiment, an operator of the system may provide a detection value which the described system may use to determine how many objects of interest to detect. By way of example and not limitation, the described system may regard the detection value provided by the operator to be the actual number of objects to be detected, a lower bound for the number of objects to be detected, or an upper bound for the number of objects to be detected. In one embodiment, the operator may be a user and/or another system such as an image recognition system from which the image is sent.

In response to receiving the image, the object detection system may extract features from the image. In one embodiment, the object detection system may extract image features using generic object detection. Examples of generic object detection may include, but are not limited to, edge detection, corner detection, blob detection, ridge detection and/or scale-invariant feature transformation. Additionally or alternatively, the object detection system may extract image features using shape-based detection. By way of example and not limitation, shape-based detection may include thresholding, blob extraction, template matching, and/or Hough transform. Although a number of feature extraction methods are described above, the present disclosure is not limited thereto. Any conventional feature extraction methods, for example, attention guided color signature, color fingerprint, multi-layer rotation invariant EOH, histogram of gradients, Daubechies wavelet, facial features and/or black & white, may additionally or alternatively, be used for extracting image features from the image.

Additionally or alternatively, the object detection system may divide the image into a number of image patches or image regions. In one embodiment, the image patches or image regions may be non-overlapping with one another. In another embodiment, at least some of the image patches or image regions may overlap with each other. In one embodiment, after the image is divided into the image patches or image regions, one or more of the feature extraction methods as described above may be applied to one or more of the image patches or image regions to obtain image features for respective one or more image patches or image regions.

In response to extracting the image features from the image, the object detection system may assign these image features to be one or more voting elements. A voting element may be defined as a feature usable to determine whether an object is present and if present, where the object is located. By way of example and not limitation, a feature that detects on a person's face may be assigned to be a voting element for detection of an object. In one embodiment, a voting element may be usable to place a vote on a hypothesis for a location of an object in the image to determine/support whether the object is present at the location as proposed or indicated by the hypothesis. In some embodiments, a voting element may cast a vote on a hypothesis for a location of an object in the image to determine/support whether the hypothesis is probabilistically true. A hypothesis is said to be probabilistically true if, for example, a total value of probabilistic votes on the hypothesis is greater than or equal to a predetermined threshold. Additionally or alternatively, a hypothesis is said to be probabilistically true if a total value of probabilistic votes on the hypothesis is maximum among other hypotheses. In one embodiment, a voting element may include one or more descriptors usable in determining a vote from the voting element on a hypothesis for a location of an object. A hypothesis for a location of an object may correspond to an assertion that an object may be positioned at the specified location in the image and is valid or true when a real object is actually positioned at or around the specified location in the image. By way of example and not limitation, the one or more descriptors may include local image appearances and/or geometric positions associated with the voting element or one or more image features used to define the voting element.

In response to obtaining one or more voting elements from the image, the object detection system may derive a probabilistic model or inference based at least on the one or more voting elements. The probabilistic model or inference may then be used to determine or ascertain one or more locations of one or more objects in the image. In one embodiment, the locations of the one or more objects may be ascertained in response to determining that one or more respective hypotheses for the locations of the one or more objects cooperatively return a maximal probability associated with the probabilistic model or inference. In other words, the locations of the one or more objects may be ascertained if a total posterior probability or log-posterior of corresponding hypotheses is maximum in the probabilistic model or inference.

In some embodiments, an optimization or semi-optimization algorithm may be applied to optimize or maximize a probability associated with the probabilistic model or inference. In one embodiment, the probabilistic model or inference may include one or more hypotheses for locations of one or more objects in the image. By way of example and not limitation, a greedy algorithm may be used to maximize a joint probability of the one or more hypotheses for the locations of the one or more objects.

In one embodiment, the probabilistic model or inference may further include a penalty factor to discourage false positives or hallucinated object detection. The penalty factor of the probabilistic model or inference may penalize the number of hypotheses used to explain the image. For example, in an event that the number of objects in the image is unknown, the penalty factor may penalize the number of hypotheses used to explain the unknown number of objects in the image. In other words, the greater the number of hypotheses used to explain the image is, the higher the penalty factor is. In one embodiment, the penalty factor may include, but is not limited to, an Occam razor and/or a Minimum Description Length (MDL) penalty factor.

In response to detecting the locations of one or more objects in the image, the object detection system may present this result to the operator of the system. The operator of the system may be allowed to modify parameters, e.g., the detection value, associated with the object detection of the system. In response to receiving modifications from the operator, the system may perform object detection on the image again. In one embodiment, the system may perform the object detection on the image completely from scratch without using any result from a previous run of object detection. In another embodiment, the system may incorporate or reuse a result from the previous run of object detection in a current run of object detection. By way of example and not limitation, the system may begin the object detection at or around previously detected object locations in the previous run of object detection.

The described system allows object detection to be performed automatically with minimal or no human intervention. The described system alleviates the use of heuristic assumptions in detecting an object and devises object detection in a probabilistic framework, thereby allowing generalization of the object detection into a variety of application fields and/or objects and facilitating integration of other object detection approaches into this probabilistic object detection method.

Multiple and varied implementations and embodiments are described below. In the following section, an exemplary environment that is suitable for practicing various implementations is described. After this discussion, illustrative implementations of systems, devices, and processes for an object detection system are described.

Exemplary Architecture

FIG. 1 illustrates an exemplary environment 100 usable to implement an object detection system. The environment 100 includes one or more users 102-1, 102-2, . . . 102-M (which are collectively referred to as 102), a network 104 and an object detection system 106. The user 102 may communicate with the object detection system 106 through the network 104 using one or more client devices 108-1, 108-2, . . . 108-N, which are collectively referred to as 108.

The device 108 may be implemented as any one of a variety of conventional computing devices including, for example, a server, a desktop PC, a notebook or portable computer, a workstation, a mainframe computer, a handheld device, a netbook, an Internet appliance, a portable reading device, an electronic book reader device, a tablet or slate computer, a television, a set-top box, a game console, a mobile device (e.g., a mobile phone, a personal digital assistant, a smart phone, etc.), a media player, a network router, etc. or a combination thereof.

The network 104 may be a wireless network, a wired network, or a combination thereof. The network 104 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless networks, wired networks, or a combination thereof.

In one embodiment, the client device 108 includes a processor 110 coupled to memory 112. The memory 112 includes an application 114 and other program data 116. The memory 112 may be coupled to or associated with, and/or accessible to other devices, such as network servers, router, and/or other client devices 108.

In one embodiment, the user 102 uses the application 114 of the client device 108 to submit an image to the object detection system 106. Alternatively, the image may be automatically be sent to or obtained by the object detection system 106 (e.g., in the case of a surveillance camera). On detecting locations of one or more objects in the image, the object detection system 106 returns the image including indicators identifying the one or more objects to the user 102.

Although the object detection system 106 and the client device 108 are described to be separate systems, the present disclosure is not limited thereto. In one embodiment, the object detection system 106 may be included in the client device 108, for example, in a form of software and/or hardware installed in the client device 108.

Figure 2:
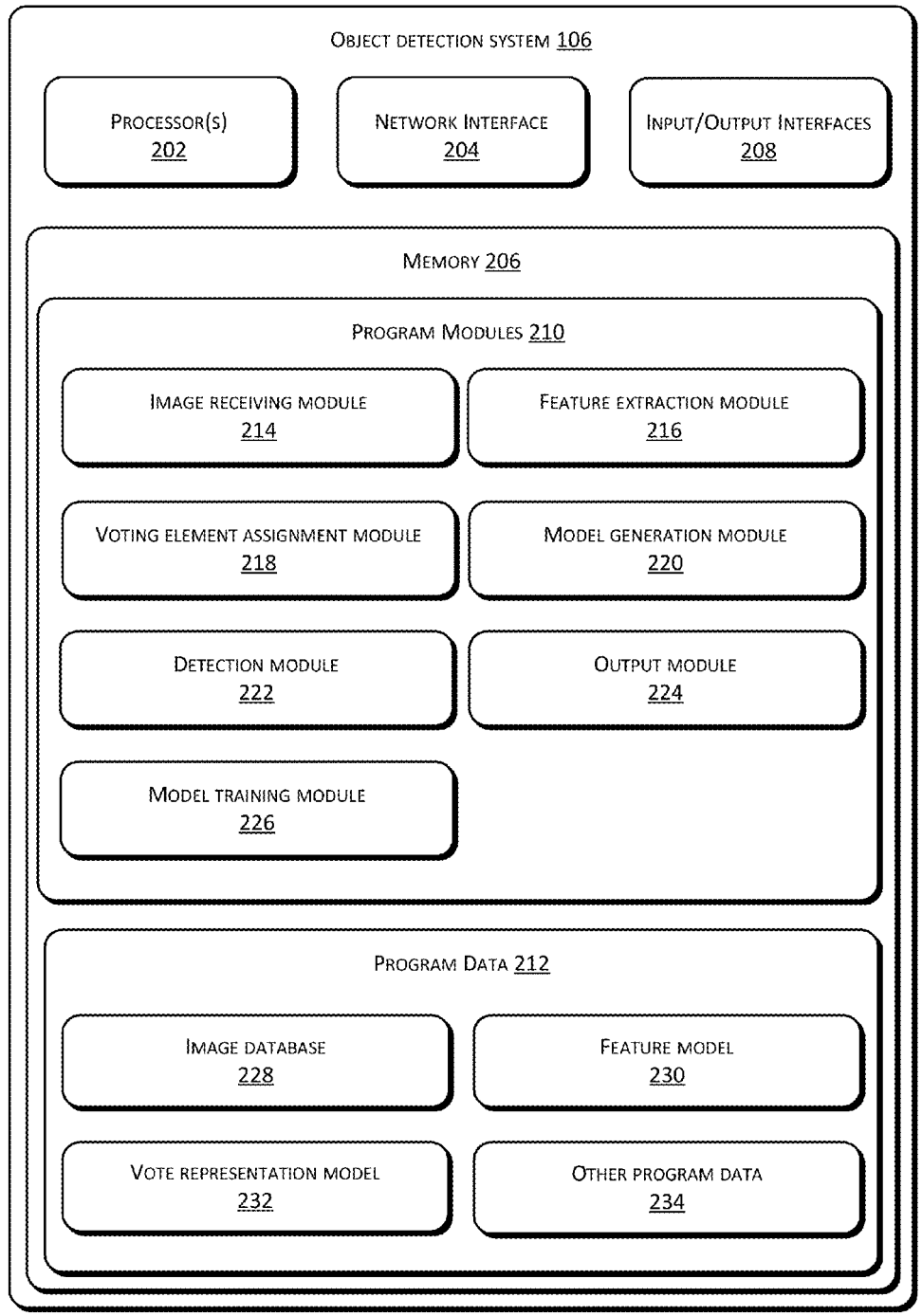
FIG. 2 illustrates the example object detection system of FIG. 1 in more detail.

FIG. 2 illustrates the object detection system 106 in more detail. In one embodiment, the system 106 can include, but is not limited to, a processor 202, a network interface 204, memory 206, and an input/output interface 208.

The memory 206 may include computer-readable media in the form of volatile memory, such as Random Access Memory (RAM) and/or non-volatile memory, such as read only memory (ROM) or flash RAM. The memory 206 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The memory 206 may include program modules 210 and program data 212. In one embodiment, the program module 210 may include an image receiving module 214 which receives an image from the user 102. The image receiving module 214 may transfer the image to a feature extraction module 216. The feature extraction module 216 may extract image features from the image. The feature extraction module 216 may use one or more feature extraction methods to extract image features from the image. Examples of feature extraction methods may include, but are limited to, generic object detection such as line/edge detection, corner detection, blog detection, ridge detection and/or scale-invariant feature transform. Additionally or alternatively, the feature extraction module 216 may extract image features using shape-based detection. By way of example and not limitation, shape-based detection may include thresholding, blob extraction, template matching, and/or Hough transform.

In response to extracting image features from the image, the object detection system 106 may include a voting element assignment module 218 to assign the image features to one or more voting elements. In one embodiment, each voting element may include one or more image features that may be different from those of other voting elements. In another embodiment, some image features of a voting element may be the same as another voting element. In one embodiment, a voting element may be usable to place a vote (e.g., a probabilistic vote) on a hypothesis for a location of an object to determine, for example, whether the hypothesis is probabilistically true. In one embodiment, a hypothesis for a location of an object may correspond to making an assertion that an object may be positioned at the specified location in the image and is valid or true if a real object is actually positioned at or around the specified location in the image. In some embodiments, a voting element may include one or more descriptors that may be usable by the voting element in determining whether the voting element may vote on the hypothesis for the location of the object. The one or more descriptors may include, but are not limited to, local image appearances and/or geometric positions associated with the voting element or one or more image features used to define the voting element.

In response to obtaining one or more voting elements from the image, a probabilistic model or inference may be derived. In one embodiment, the object detection system 106 may further include a model generation module 220 to derive or generate a probabilistic model or inference. In one embodiment, the model generation module 220 may derive or generate the probabilistic model or inference based at least on the one or more voting elements. Additionally, the model generation module 220 may derive or generate the probabilistic model or inference based further on one or more hypotheses for locations of one or more objects.

The object detection system 106 may include a detection module 222 to ascertain locations of one or more objects based at least on the probabilistic model or inference. In one embodiment, the probabilistic model may include a posterior probability or a log-posterior. The detection module 222 may apply an optimization algorithm to find a set of hypotheses (for locations of one or more objects) that may optimize or maximize the posterior probability or the log-posterior of the probabilistic model. In some embodiments, the detection module 222 may ascertain locations of one or more objects in response to determining that one or more corresponding hypotheses optimize or maximize the posterior probability or the log-posterior of the probabilistic model.

In one embodiment, the detection module 222 may apply an optimization algorithm to iteratively find a hypothesis (for a location of an object) that may receive maximal probabilistic votes from the one or voting elements in a respective iteration of the optimization algorithm. The detection module 222 may ascertain a location of an object in response to determining that a respective hypothesis receives maximal probabilistic votes from the one or more voting elements in a respective iteration of the optimization algorithm. In one embodiment, the detection module 222 may terminate iterations of the optimization algorithm when a predetermined number of iterations is reached. In other embodiments, the detection module 22 may terminate iterations of the optimization algorithm when an increase in the posterior probability or the log-posterior of the probabilistic model due to new assignment of voting elements to the hypothesis that receives the maximal votes is less than a predetermined threshold.

In some embodiments, the optimization algorithm may include a greedy optimization algorithm. In other embodiments, the optimization algorithm may include loopy belief propagation and/or simulated annealing optimization.

In response to ascertaining one or more locations of one or more objects in the image, the object detection module 222 may include an output module 224 to send a result to the user 102 through the client device 108. In one embodiment, the output module 224 may send the image including indicators of the one or more locations of the one or more objects to the user 102. By way of example and not limitation, location indicators may include, but are not limited to, bounding boxes (or other shapes) substantially enclosing respective detected objects and/or markers on top of the detected objects. In another embodiment, the output module 224 may send information of the locations of the one or more locations of the one or more objects to the client device 108 of the user 102, which may incorporate this information to the image on the client device 108.

In one embodiment, the object detection system may further include a model training module 226. The model training module 226 may train on images stored in an image database 228. In some embodiments, the stored images may include images that are labeled by one or more users 102 or a device that is capable of performing image or object recognition. Additionally or alternatively, the stored images may include images without any pre-labeling. The model training module 226 may train one or more feature models 230 using the stored image in the image database 228 and store the one or more feature models 230 in the memory 206.

In one embodiment, a feature model may be specified for a particular type of object such as vehicle. In another embodiment, a feature model may be generalized to include one or more types of objects, e.g., faces of humans and faces of animals. In one embodiment, the feature extraction module 216 may use a trained feature model to extract image features specified for an object of interest. The model training module 226 may train the one or more feature models using any conventional training procedures usable for feature extraction models such as training procedures for Implicit Shape Models and/or Hough forests.

In some embodiments, the model training module 226 may further train a vote representation model 232 based on features of a feature model 230. In one embodiment, the model training module 226 may train a vote representation model 232 in form of one or more codebooks of appearances of object parts. In another embodiment, the model training module 226 may train a vote representation model in form of a direct mapping between an appearance of an image feature or patch, for example, and a corresponding vote (e.g., a vote provided by a Hough forest). In one embodiments, the model training module 226 may train a vote representation model using a training procedure that is developed for a Hough-based detection such as Implicit Shape Models and Hough forest.

A Hough forest is a random forest that may directly map an image patch appearance to a probabilistic vote about a possible location of an object centroid. A set of leaf nodes of each tree in the Hough forest may be regarded as a discriminative codebook. Each leaf node may make a probabilistic decision as to whether a patch corresponds to a part of an object or to the background, and cast a probabilistic vote about a centroid position with respect to the center of the patch. Each tree may be built based on a collection of patches drawn from training data and may be trained in a supervised training approach. Detailed descriptions of an example vote representation model in terms of a Hough forest and corresponding training procedure may be found in "Class-Specific Hough Forests for Object Detection," which was presented at IEEE Conference on Computer Vision and Pattern recognition (CVPR'09) held Jun. 22-25, 2009.

In an event that a Hough forest is used for vote representation, the object detection module 222 may detect locations of one or more objects by traversing the one or more voting elements through the Hough forest based on the one or more descriptors. The Hough forest may include a plurality of trees.

In one embodiment, the detection module 222 may traverse the one or more voting elements to one or more leaf nodes of the plurality of trees. Each leaf node may include one or more class labels and one or more offset vectors defining positions of class objects corresponding to the one or more class labels. Furthermore, in response to traversing the one or more voting elements to the one or more leaf nodes of the plurality of trees, the detection module 222 may obtain probabilistic votes from the one or more leaf nodes of the plurality of trees that are reached by the one or more voting elements. The detection module 222 may use these probabilistic votes from the one or more leaf nodes to determine which hypotheses for locations of objects may be probabilistically valid or true. In some embodiments, the detection module 222 may apply the optimization algorithm, e.g., a greedy algorithm, to iteratively increase a total or joint probability for the hypotheses for the locations of the objects that are based on the probabilistic votes from the one or more leaf nodes. The detection module 222 may determine that a hypothesis is valid, i.e., an object is detected to be position at a location corresponding to the hypothesis, in response to determining that the hypothesis receives a maximal probabilistic vote from the one or more leaf nodes and increases the total or joint probability. By way of example and not limitation, the detection module 222 may determine that a hypothesis is valid in response to determining that the hypothesis receives a maximal probabilistic vote from the one or more leaf nodes and increases the total or joint probability greater than a predetermined threshold, e.g., increased by 5%, etc.

In other embodiments, the program data 212 may further include other program data 234 that may or may not be relevant to object detection. By way of example and not limitation, the other program data 234 may include log data related to images having been received and corresponding object detection results for the images. The detection module 222 may reuse some of the log data to facilitate object detection in a new received image.

Example Framework

An example probabilistic framework is described hereinafter. Hough forest is employed for feature extraction herein for illustration purpose only and should not be construed as a limitation to the scope of the claimed subject matter.

Hough Transform

On receiving an image, N voting elements, with i as an index for i-th voting element, may be obtained. In one embodiment, these voting elements may correspond to, for example, pixels in an edge map (in an event of line/edge detection), or interest points (in an event of an implicit shape model detection), etc. A Hough space H may be defined, in which each point h ∈ H corresponds to a hypothesis about a presence of an object of interest h (e.g., a line, a person, etc) in a particular location/configuration.

Under this context of Hough-based detection, a detection task may be formulated as finding a finite subset of the Hough space that corresponds to one or more objects that are actually present in the received image. In one embodiment, for each hypothesis h ∈ H, a binary random variable, $y_h$, may be introduced. The binary random variable $y_h$ may take a value 1 if a respective hypothesis actually corresponds to a real object in the image and take a value 0 otherwise.

In one embodiment, the Hough transform may perform object detection by considering each voting element independently and reasoning which object h may have generated the i-th voting element, for example. In some embodiments, another random variable, $x_i$, which may take a value in an augmented Hough space H'=H ∪ 0, may be introduced. An assignment of $x_i$=h ∈ H may imply that an i-th voting element is generated by an object h, while $x_i$=0 may imply that the i-th voting element comes from a background clutter and/or objects other than an object of interest.

In one embodiment, a vote from an i-th voting element may be considered as a (pseudo)-density $V(x_i=h|I_i)$ in the Hough space conditioned on a descriptor $I_i$ of the i-th voting element. The descriptor may include, but is limited to, a geometric position of the i-th voting element in an original spatial or scale space of the image and/or a local image appearance associated with the i-th voting element. Conditional (pseudo)-densities of the voting elements (i.e., N voting elements) may then be combined together and one or more peaks of a resulting combination may be considered as valid hypotheses.

In one embodiment, the conditional (pseudo)-densities of the voting elements may be merely summed up together. In another embodiment, rather than summing the conditional (pseudo)-densities (or the votes) of the voting elements, a joint distribution over all random variables $x=\{x_i\}$ and $y=\{y_i\}$ may be modeled in a probabilistic framework and values of the votes may be determined via a probabilistic inference, e.g., a Maximum-a-Posteriori (MAP) inference. In one embodiment, a joint posterior probability of x and y given an image I may be modeled, where a collection of N voting elements may be used to represent the image I.

According to the Bayes theorem, $$p(x,y|I) \propto p(I|x,y) \cdot p(x,y) \quad (1)$$

Likelihood Term

In one embodiment, distributions over hypotheses generating voting elements may be made independent (i.e., ∀i, j:$p(x_i|I_i) \perp p(x_j|I_j)$). Alternatively, rather than making independence assumption of distributions over hypotheses generating voting elements, distributions of appearances of voting elements may be made to be independent, given existing objects y and hypotheses assignment x:

$$p(I|x,y) = \Pi_{i=1}^N p(I_i|x,y) \quad (2)$$

Furthermore, a descriptor $I_i$ of the i-th voting element may be determined to be dependent only on an object assignment $x_i$, and conditionally independent of assignments of other voting elements and existence of other objects in the image. Therefore, $$p(I|x,y) = \Pi_{i=1}^N p(I_i|x_i) \quad (3)$$

Although an appearance of the i-th voting element is determined to be dependent only on an object assignment or assigned hypothesis $x_i$, and conditionally independent of assignments of other voting elements and hypotheses, this dependence may still encode a relative positioning of the i-th voting element and an object corresponding to the object assignment or assigned hypothesis $x_i$. For example, in an event of vehicle detection, an expression $p(I_i|x_i)$ may model an appearance of a voting element (e.g., interest point_as a random variable dependent on a part of a vehicle the voting element comes from.

By applying the Bayes theorem to Equation (3) and ignoring terms that are constant for the given image, the likelihood term becomes:

$$p(I|x,y) = \prod_{i=1}^N p(I_i|x_i) \propto \prod_{i=1}^N \frac{p(x_i|I_i)}{p(x_i)} \quad (4)$$

As a result, Equation (1) may be rewritten as:

$$p(I|x,y) \propto \prod_{i=1}^N p(x_i|I_i) \cdot \frac{p(x,y)}{\prod_{i=1}^N p(x_i)} \quad (5)$$

Prior Term

Before prior distributions p(x,y) are formulated, it should be noted that not all configurations (x,y) are valid. If a voting element, e.g., the i-th voting element, is assigned to a non-background hypothesis $h(x_i=h)$, the hypothesis h is required to correspond to an existing object, i.e., $y_h$ needs to be one. Thus, a configuration (x,y) is valid if and only if $y_{x_i}=1$, ∀$x_i$. In order to avoid treating background assignments $x_i=0$ as a special case, in one embodiment, a background hypothesis variable $y_0$, which is always set to 1, may be introduced. Therefore, a consistency of the configuration (x,y) may be expressed by a hard constraint $\Pi_{i=1}^N y_{x_i}=1$.

Given that the configuration (x,y) is valid, the prior term of Equation (1) may be factorized into products of priors on y and individual $x_i$:

$$p(x,y)=Z_1 \Pi_{i=1}^N y_{x_i} p(y) \cdot \Pi_{i=1}^N p(x_i) \quad (6)$$

where $Z_1$ is a normalization constant.

In one embodiment, a general prior on y, which penalizes the number of active hypotheses $\Sigma_{h \in H} y_h$ and prefers explanations of a scene in the image with as fewer objects as possible, may be included in this probabilistic framework or model. In one embodiment, a penalty factor may be included in the probabilistic framework or model. Examples of a penalty factor may include, but are not limited to, an Occam razor or a Minimum Description Length (MDL) prior/penalty factor. For example, $$p(y)=Z_2 \exp(-\lambda \Sigma_{h \in H} y_h) = C_2 \Pi_{h \in H} \exp(-\lambda y_y) \quad (7)$$

where $Z_2$ is a normalization constant.

By substituting Equations (6) and (7) into Equation (5), a final expression for the posterior probability may become:

$$p(x,y|I) \propto \Pi_{i=1}^N p(x_i|I_i) \cdot \Pi_{i=1}^N y_{x_i} \Pi_{h \in H} \exp(-\lambda y_h) \quad (8)$$

Inference

In one embodiment, a Maximum-a-Posteriori (MAP) configurations (or MAP-inference) may be used under the probability model as defined in Question (8). By taking logarithm of Equation (8), the MAP-inference in the probability model may be rendered as a maximization problem for the following log-posterior function:

$$E(x,y)=\sum_{i=1}^{N}u_i(x_i)+\sum_{h\in H}v_h(y_h)+\sum_{h\in H}\sum_{i=1}^{N}w_{ih}(x_i,y_h) \quad (9)$$

where $u_i(x_i)=\log p(x_i|I_i)$, $v_h(y_h)=-\lambda y_h$, and $w_{ih}(x_i,y_h)=-\infty$ if $x_i=h$ and $y_h=0$ and $w_{ih}(x_i,y_h)=0$ otherwise.

In some embodiments, on noting that Equation (9) is "bipartite" involving two sets of variables x and y, optimal values of $x_i$ may be chosen independently if a configuration of y is given. Thus the log-posterior as given in Equation (9) may be represented as a function of the hypotheses variables y, after the variables x are "maximized out:"

$$E_y(y)=\max_x E(x,y)=\sum_{h\in H}-\lambda y_h+\sum_{i=1}^{N}\max(\max_{h:y_h=1}(u_i(h),u_i(0))) \quad (10)$$

In one embodiment, a greedy algorithm may be used to identify optimal hypotheses for the image. In some embodiment, the greedy algorithm applies no sparsification heuristics. In one embodiment, a Hough voting with specific votes that may be updated on each iteration of the greedy algorithm may be performed. In each iteration or step t, an i-th voting element may cast a vote (e.g., an additive vote):

$$V_i^t(h)=\max(\log P(x_i=h|I_i)-\log P(x_i=x_i^t|I_i),0) \quad (11)$$

where $x_i^t$ denotes a hypothesis that the i-th voting element is assigned at step t. Each vote thus may encode a potential increase of the log-posterior part for respective voting element if the hypothesis h is enabled.

In some embodiments, the votes from the voting elements may be accumulated into a Hough image $M^t(h)=\sum_{i=1}^{n}V_i^t(h)$. In one embodiment, a maximal value hypothesis $h^t=\text{argmax}(M^t(h))$ may then considered. For example, the maximal value hypothesis $h^t$ may be considered to be valid and indicating an actual object of interest in the image. In another embodiment, $M^t(h^t)$ may be further compared with a predetermined parameter such as $\lambda$ as indicated in Equation (10) or other threshold. If $M^t(h^t)$ is less than or equal to the predetermined parameter, the greedy algorithm may terminate as the log-posterior as indicated in Equation (10) cannot be increased any further in a greedy way. Otherwise, $y_{h^t}^t$ may be set to one, and $x_i$ may be switched to $h^t$ (i.e., $x_i^{t+1}$ is set to $h^t$), if $x_i$ increases the log-posterior at the t-th iteration/step.

Figure 3:
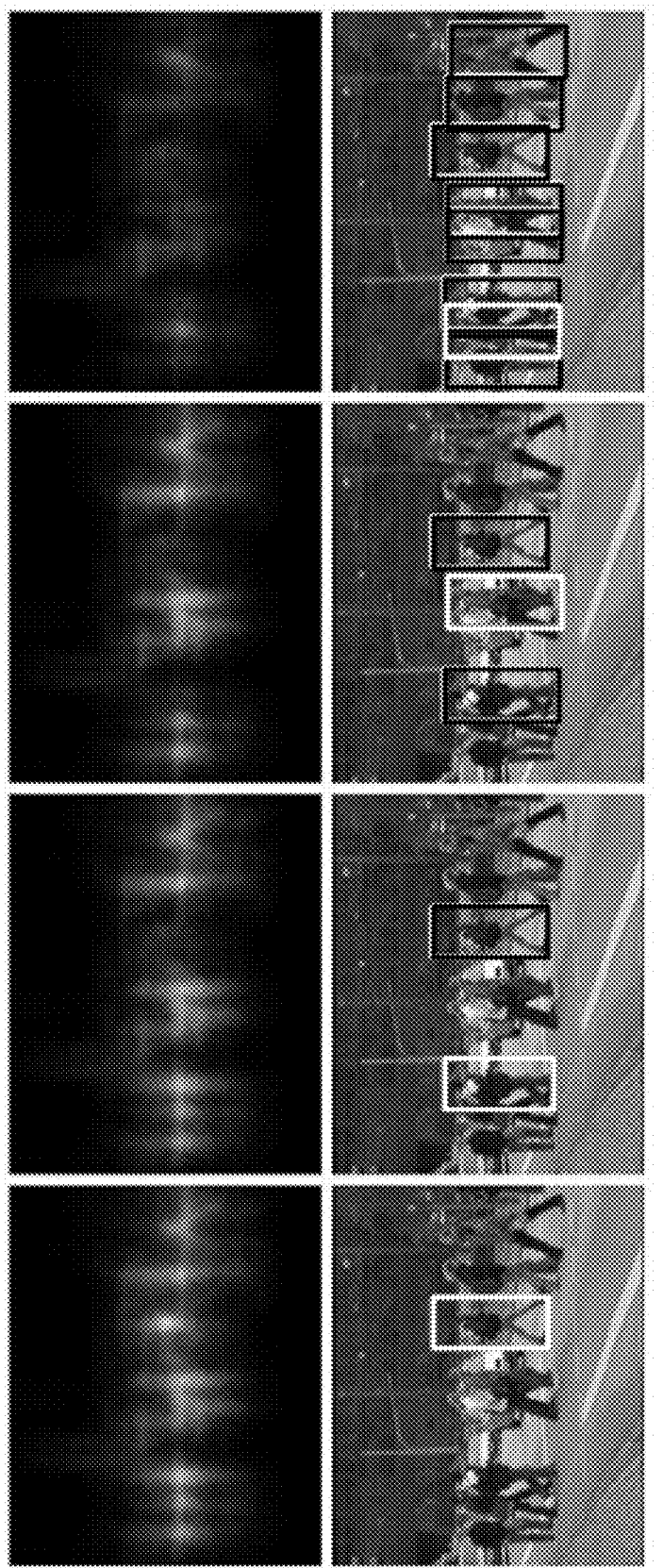
FIG. 3 illustrates an exemplary object detection result using the example object detection system of FIG. 2.

In one embodiment, rather than performing Hough voting once as in conventional Hough transform, the greedy algorithm may cause the Hough voting to be performed multiple times with dynamically changing votes. An example of this process may be visualized in FIG. 3. FIG. 3 shows applying a greedy MAP-inference in the described probabilistic model for detecting pedestrians. For each iteration, the upper image corresponds to a Hough image $M^t$, and the lower image shows a detection (which is highlighted in white) corresponding to a maximum in corresponding iteration. The Hough images $M^t(h)$ change between iterations. In one embodiment, these dynamic changes driven by the probability distribution of Equation (8) may be regarded as a principled non-maximum suppression procedure.

In one embodiment, in order to obtain the probabilistic votes from the voting elements, a Hough forest that is learned on a separate training dataset may be used. On training Hough forest, the Hough forest may be able to map patch appearances and/or locations of the voting elements and therefore can be used in the described probabilistic framework.

Alternative Embodiments

In one embodiment, prior distribution p(x,y) as described in the foregoing embodiments may be chosen according to other approaches. In one embodiment, a Potts prior on x, which states that, if a voting element, e.g., i-th voting element, is assigned to a hypothesis h, an adjacent voting element, e.g., j-th voting element, is also likely to be assigned to the hypothesis h, may be used.

In other embodiments, a standard non-maxima suppression via an overlap criterion may be introduced into the above-described framework. For example, a prior, which may assign zero probability to all configurations y where there exists a pair of hypotheses with respective bounding boxes overlapping to a degree greater than a predetermined overlap threshold, may be defined.

Exemplary methods

Exemplary methods for are described with reference to FIGS. 4-6. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described herein. In the context of software, the blocks represent computer instructions that, when executed by one or more processors, perform the recited operations. For ease of illustration the methods are described in the context of the example environment and systems of FIGS. 1 and 2, but the methods are not limited to being performed in the environment or using the systems described herein.

Figure 4:
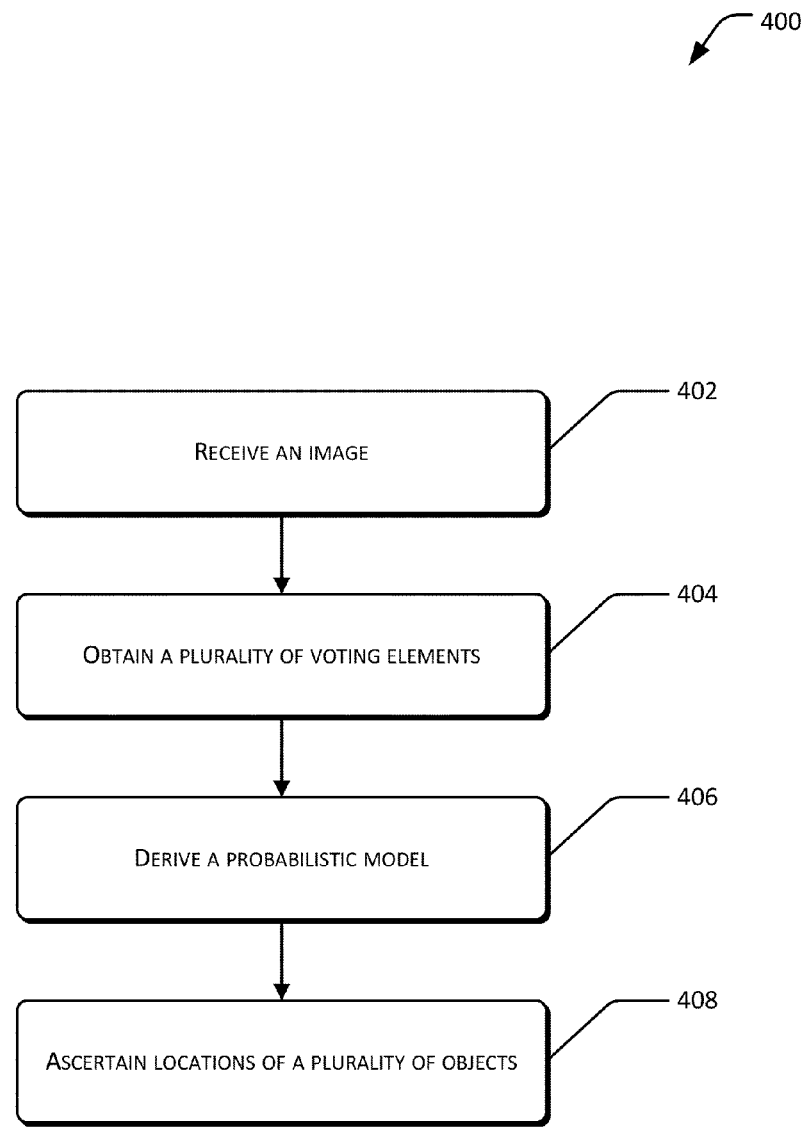
FIG. 4 illustrates a first exemplary method of detecting and localizing an object in an image.

FIG. 4 illustrates a first exemplary method 400 of detecting objects in an image.

At block 402, the object detection system 106 may receive an image, for example, through the image receiving module 214. The image may include a certain number of objects of interest. In one embodiment, this number of objects of interest in the image may be unknown to the object detection system 106. In another embodiment, the exact number of objects, a lower bound for the number of objects or an upper bound for the number of objects in the image may be made known to the system.

At block 404, the vote element assignment module 218 may obtain a plurality of voting elements from the image. The plurality of voting elements may be capable of placing votes on one or more hypotheses to determine one or more locations of one or more objects in the image.

In one embodiment, the plurality of voting elements may be obtained by dividing the image into a predetermined number of image segments and assigning information of the image segments to respective voting elements. In some embodiments, the image may be divided into a predetermined number of non-overlapped image segments. In other embodiments, some of the image segments divided from the image may overlap with one another. By way of example and not limitation, the image segments may include edge pixels, interest points, image patches and/or image regions.

Additionally or alternatively, the plurality of voting elements may be obtained by assigning image features of the image extracted by the feature extraction module 216 using any one or more feature extraction methods, such as Hough forests, as described in the foregoing descriptions.

Additionally, the plurality of voting elements may include a plurality of descriptors which are usable in determining votes on a plurality of hypotheses for locations of a plurality of objects. By way of example and not limitation, the plurality of descriptors may include local image appearances and/or geometric positions of the plurality of voting elements.

At block 406, the model generation module 220 may derive a probabilistic model based at least on the plurality of voting elements. In one embodiment, the probabilistic model may further include a penalty factor to discourage hallucinated object detection by penalizing number of the plurality of hypotheses used to explain the unknown number of objects in the image. The penalty factor may include, but are not limited to, an Occam razor or a Minimum Description Length (MDL) penalty factor.

At block 408, the detection module 222 may ascertain locations of a plurality of objects based at least in part on the probabilistic model. In one embodiment, the locations of the plurality of objects may be ascertained based further on a greedy algorithm which maximizing a joint probability of a plurality of hypotheses for the locations of the plurality of objects.

Figure 5:
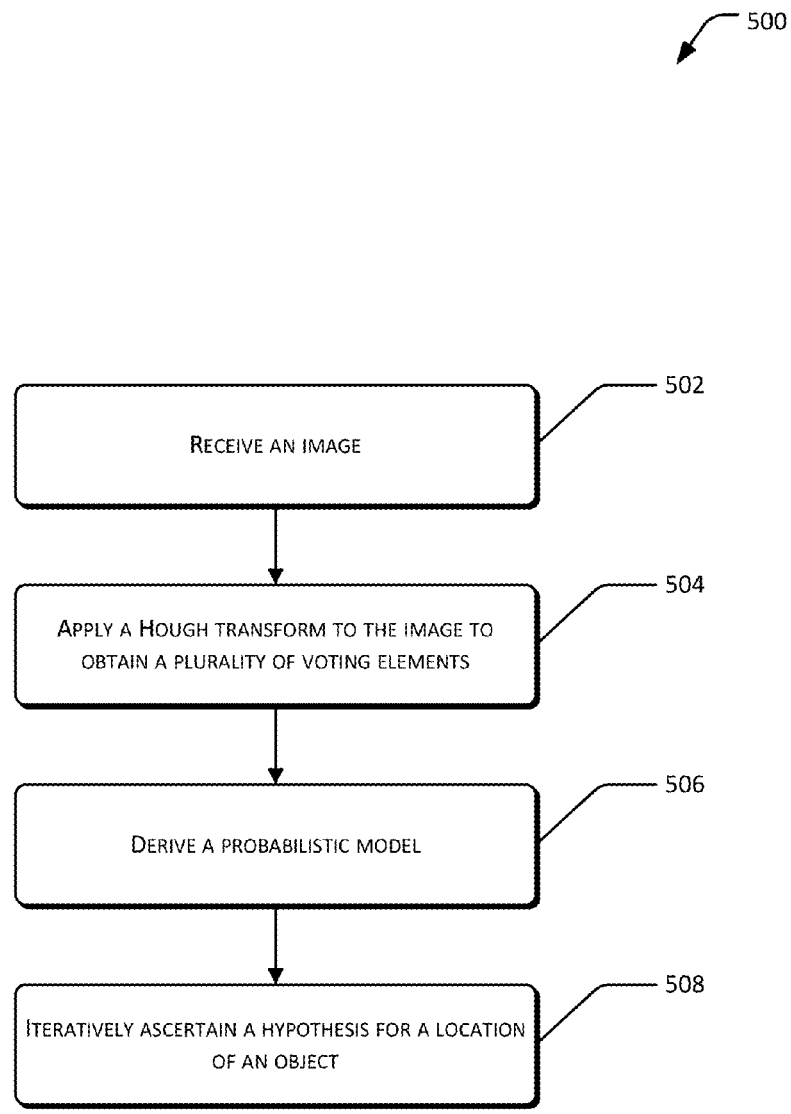
FIG. 5 illustrates a second exemplary method of detecting and localizing an object in an image.

FIG. 5 illustrates a second exemplary method 500 of detecting objects in an image.

At block 502, the object detection system 106 may receive an image including an unknown number of objects.

At block 504, the feature extraction module 216 may apply a Hough transform to the image to obtain a plurality of voting elements. The plurality of voting elements may be usable to place probabilistic votes on one or more hypotheses for locations of one or more objects.

At block 506, the model generation module 220 may derive a probabilistic model based at least on the plurality of voting elements and the one or more hypotheses for the locations of the one or more objects. In one embodiment, the probabilistic model may combine the probabilistic votes from the plurality of voting elements on the one or more hypotheses for the locations of the one or more objects.

At block 508, the detection module 222 may iteratively ascertain a hypothesis for a location of an object in the image based at least on the probabilistic model. In one embodiment, the detection module 222 may ascertain a hypothesis for a location of an object in the image based at least on the probabilistic model in response to determining that probabilistic votes on the hypothesis for the location of the object is maximum compared to other hypotheses for locations of other objects in a respective iteration.

Figure 6:
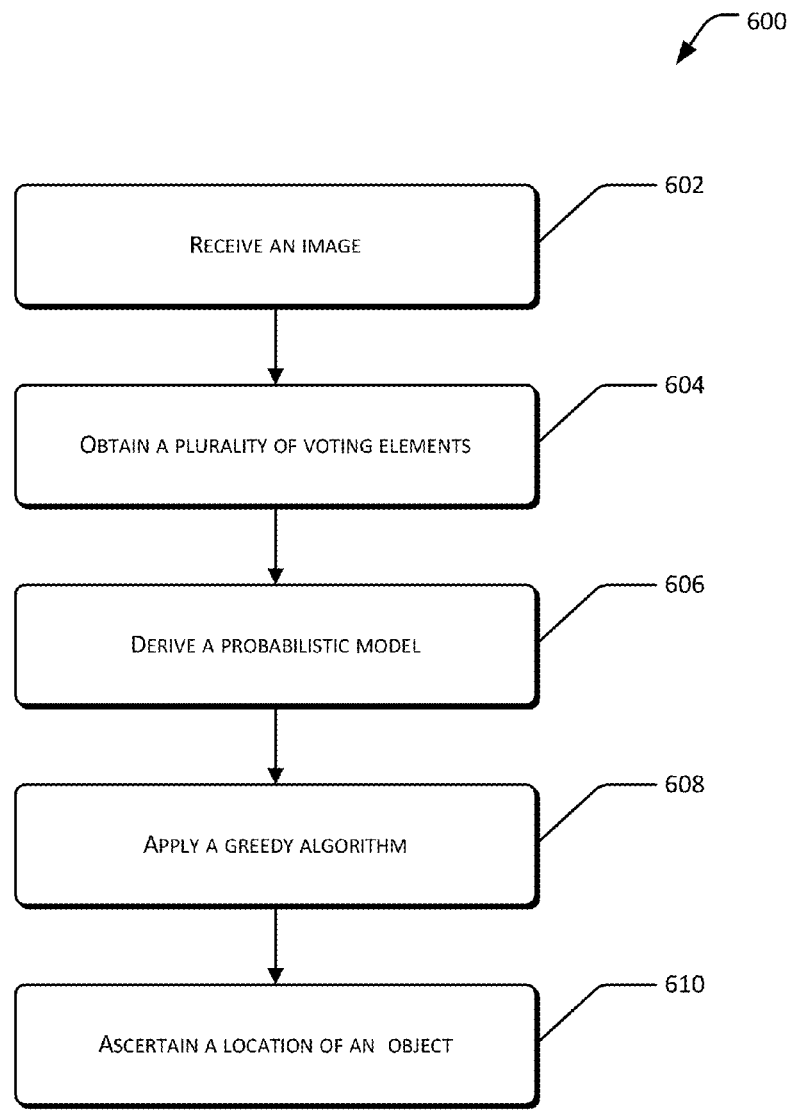
FIG. 6 illustrates a third exemplary method of detecting and localizing an object in an image.

FIG. 6 illustrates a third exemplary method 600 of detecting objects in an image.

At block 602, the image receiving module 214 of the object detection system 106 may receive an image. The image may include an unknown number of objects to be detected.

At block 604, the voting element assignment module 218 may obtain one or more voting elements from the image. In one embodiment, the one or more voting elements may be capable of casting votes on a hypothesis for a location of an object to determine whether the hypothesis is probabilistically true.

At block 606, the model generation module 220 may derive a probabilistic model based at least on the one or more voting elements. Additionally, the probabilistic model may be derived based further on one or more hypotheses for locations of one or more objects.

At block 608, the detection module 222 may apply a greedy algorithm to iteratively assign a voting element of the one or more voting elements to a hypothesis of the one or more hypotheses in response to determining that assigning the voting element to the hypothesis increases a log-posterior probability associated with the probabilistic model.

At block 610, the detection module 222 may ascertain a location of an object in the image in response to determining that votes for a hypothesis for the ascertained location of the object are maximum among the one or more hypothesis in a respective iteration of the greedy algorithm.

Any of the acts of any of the methods described herein may be implemented at least partially by a processor or other electronic device based on instructions stored on one or more computer-readable media.

Conclusion

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A computer-implemented method comprising:
under control of one or more processors configured with executable instructions:
receiving an image including an unknown number of objects to be detected;
obtaining a plurality of voting elements from the image, the plurality of voting elements placing votes on one or more hypotheses to determine one or more locations of one or more objects in the image;
deriving a probabilistic model based at least on the plurality of voting elements; and
ascertaining locations of a plurality of objects in the image based at least in part on the probabilistic model, the probabilistic model including a penalty factor to discourage hallucinated object detection by penalizing a number of hypotheses used to explain the unknown number of objects in the image, wherein the penalty factor increases as the number of hypotheses used to explain the unknown number of objects in the image increases.

2. The computer-implemented method as recited in claim 1, wherein the plurality of voting elements include a plurality of descriptors, the plurality of descriptors usable in determining votes on a plurality of hypotheses for the locations of the plurality of objects.

3. The computer-implemented method as recited in claim 2, wherein the plurality of descriptors include local image appearances and/or geometric positions of the plurality of voting elements.

4. The computer-implemented method as recited in claim 1, wherein the plurality of voting elements include a plurality of descriptors, and ascertaining the locations of the plurality of objects further include traversing the plurality of voting elements through a Hough forest including a plurality of trees based on the plurality of descriptors.

5. The computer-implemented method as recited in claim 4, wherein traversing the plurality of voting elements includes traversing the plurality of voting elements to one or more leaf nodes of the plurality of trees, each leaf node including one or more class labels and one or more offset vectors defining positions of class objects corresponding to the one or more class labels.

6. The computer-implemented method as recited in claim 4, wherein ascertaining the locations of the plurality of objects further includes obtaining probabilistic votes from one or more leaf nodes of the plurality of trees reached by the plurality of voting elements.

7. The computer-implemented method as recited in claim 4, wherein ascertaining the locations of the plurality of objects in the image is further based on a greedy algorithm that maximizes a joint probability of a plurality of hypotheses for the locations of the plurality of objects, the greedy algorithm iteratively increasing a total probability that is based on probabilistic votes obtained from one or more leaf nodes of the plurality of trees for the plurality of hypotheses for the locations of the plurality of objects.

8. The computer-implemented method as recited in claim 1, wherein obtaining the plurality of voting elements includes dividing the image into a predetermined number of image segments and assigning information of each image segment to each voting element.

9. The computer-implemented method as recited in claim 8, wherein the image segments include edge pixels, interest points, image patches and/or image regions.

10. The computer-implemented method as recited in claim 1, wherein ascertaining the locations of the plurality of objects in the image is further based on a greedy algorithm that maximizes a joint probability of a plurality of hypotheses for the locations of the plurality of objects, and the plurality of hypotheses for the locations of the plurality of objects minimize likelihoods of the plurality of voting elements from voting on a hypothesis for a location of an object other than the plurality of objects.

11. The computer-implemented method as recited in claim 1, wherein the penalty factor includes an Occam razor or a Minimum Description Length (MDL) penalty factor.

12. One or more computer storage media storing executable instructions that, when executed by one or more processors, cause the one or more processors to perform acts comprising:
  receiving an image including an unknown number of objects to be detected;
  obtaining a plurality of voting elements from the image, the plurality of voting elements placing votes on one or more hypotheses to determine one or more locations of one or more objects in the image;
  deriving a probabilistic model based at least on the plurality of voting elements; and
  ascertaining locations of a plurality of objects in the image based at least in part on the probabilistic model, the probabilistic model including a penalty factor to discourage hallucinated object detection by penalizing a number of hypotheses used to explain the unknown number of objects in the image, wherein the penalty factor increases as the number of hypotheses used to explain the unknown number of objects in the image increases.

13. The one or more computer storage media as recited in claim 12, wherein the plurality of voting elements include a plurality of descriptors, the plurality of descriptors usable in determining votes on a plurality of hypotheses for the locations of the plurality of objects.

14. The one or more computer storage media as recited in claim 13, wherein the plurality of descriptors include local image appearances and/or geometric positions of the plurality of voting elements.

15. The one or more computer storage media as recited in claim 12, wherein the plurality of voting elements include a plurality of descriptors, and ascertaining the locations of the plurality of objects further include traversing the plurality of voting elements through a Hough forest including a plurality of trees based on the plurality of descriptors.

16. The one or more computer storage media as recited in claim 12, wherein obtaining the plurality of voting elements includes dividing the image into a predetermined number of image segments and assigning information of each image segment to each voting element.

17. A system comprising:
  one or more processors;
  memory storing executable instructions that, when executed by the one or more processors, cause the one or more processors to perform acts comprising:
  receiving an image including an unknown number of objects to be detected;
  obtaining a plurality of voting elements from the image, the plurality of voting elements placing votes on one or more hypotheses to determine one or more locations of one or more objects in the image;
  deriving a probabilistic model based at least on the plurality of voting elements; and
  ascertaining locations of a plurality of objects in the image based at least in part on the probabilistic model, the probabilistic model including a penalty factor to discourage hallucinated object detection by penalizing a number of hypotheses used to explain the unknown number of objects in the image, wherein the penalty factor increases as the number of hypotheses used to explain the unknown number of objects in the image increases.

18. The system as recited in claim 17, wherein the plurality of voting elements include a plurality of descriptors, the plurality of descriptors usable in determining votes on a plurality of hypotheses for the locations of the plurality of objects.

19. The system as recited in claim 18, wherein the plurality of descriptors include local image appearances and/or geometric positions of the plurality of voting elements.

20. The system as recited in claim 17, wherein obtaining the plurality of voting elements includes dividing the image into a predetermined number of image segments and assigning information of each image segment to each voting element.

* * * * *